United States Patent [19]

Fritel et al.

[11] Patent Number: 4,461,490

[45] Date of Patent: Jul. 24, 1984

[54] STRUCTURAL SUPPORT FOR OUTRIGGER

[75] Inventors: Raymond Fritel; Garold L. McPeak, both of Olathe, Kans.

[73] Assignee: RO Corporation, Olathe, Kans.

[21] Appl. No.: 316,656

[22] Filed: Oct. 30, 1981

[51] Int. Cl.[3] .................................................. B60S 9/22

[52] U.S. Cl. ................................. 280/763.1; 212/189; 280/766.1

[58] Field of Search ............... 280/760, 763, 764, 765, 280/766, 760.1, 766.1, 763.1, 764.1, 765.1; 212/189; 254/89 R, 89 H, 419; 52/23, 292; 248/352

[56] References Cited

U.S. PATENT DOCUMENTS

| | | | |
|---|---|---|---|
| 2,767,995 | 10/1956 | Stout | 212/189 |
| 2,958,508 | 11/1960 | Martinez | 254/89 H |
| 3,807,756 | 4/1974 | Glassmeyer | 280/766 |
| 3,918,742 | 11/1975 | Gaibler | 280/764 |
| 3,989,276 | 11/1976 | Hamerl | 280/763 |
| 4,050,718 | 9/1977 | Newcomb | 280/763 |
| 4,276,985 | 7/1981 | Newman | 212/189 |

*Primary Examiner*—David M. Mitchell
*Attorney, Agent, or Firm*—Schmidt, Johnson, Hovey & Williams

[57] ABSTRACT

An improved structural support for attaching an outrigger to a mobile equipment platform is provided that facilitates assembly of the outrigger and platform to the frame of a truck, and establishes a secure yet flexible joint between the outrigger and the platform. The structural support hereof preferably includes a pair of laterally spaced apart, vertically oriented, elongated brackets attached to and depending from the equipment platform for receiving an associated ground-engaging support member of the outrigger, and a bolt assembly for securing the outrigger to the brackets. The support may be employed to bolt an outrigger to a platform pre-positioned on the frame of a truck, with the truck frame interposed between the outrigger and the platform. Spacers may advantageously be interposed between the outrigger and the truck frame so that the structural support may readily accommodate attachment of an equipment platform and outrigger to truck frames of varying dimensions. The bolt assembly serves to securely attach the outrigger to the equipment platform, thereby tightly engaging the truck frame between the platform and outrigger and eliminating the need for welding between the outrigger and platform or truck frame.

12 Claims, 7 Drawing Figures

STRUCTURAL SUPPORT FOR OUTRIGGER

BACKGROUND OF THE INVENTION

1. Field of the Invention

This invention relates to a structural support used to attach outriggers to mobile equipment platforms which provides numerous advantages including ease of assembly, elimination of welding between the outrigger and the platform or truck frame, and the provision of a flexible joint between the outrigger and platform for attenuation of shear stresses. More particularly, the invention is concerned with a structural support having a pair of laterally spaced, vertically oriented, elongated brackets attached to and depending from the equipment platform, and a releaseable bolt assembly for securing the outrigger to the brackets.

2. Description of the Prior Art

It is known in the art of mobile booms such as cranes and the like to attach a sub-frame or equipment platform to the frame of a truck, and to provide the truck with ground-engaging outriggers to provide a sturdy operating base for the equipment. Heretofore, it has been customary to attach the outrigger to the truck by initially welding the outrigger to the equipment platform, and sliding the frame of the truck between the previously welded together platform and outrigger. Final attachment involves perforating the truck frame with bolt-receiving apertures, and bolting the outrigger to the frame of the truck. Although this means for attachment of an outrigger and platform to the truck frame provides a sturdy joint, the process of positioning the truck frame between the outrigger and equipment platform is awkward, perforation of the truck frame is not particularly desirable, the welded joint between the platform and outrigger is rigid and inflexible, and it is difficult to accommodate the welded structural support to truck frames of non-standard dimensions.

The difficulty in positioning the truck frame between the outrigger and platform arises because it is often desirable to have the dealer, rather than the manufacturer, attach the equipment platform and outrigger to a truck frame. In addition, it is also desirable to weld the outrigger to the equipment platform at the manufacturer's site, so that quality control of the welding joint can be assured. If the equipment platform and outrigger are pre-welded at the manufacturer's site, however, the dealer must have a facility for suspending the equipment platform, and for backing the truck frame between the outrigger and the platform. This obviously requires extensive dealer equipment which may not always be available. In addition, truck frames are available to either dealers or manufacturers in varying dimensions. If an outrigger is pre-welded to an equipment platform for attachment to a particular size of truck frame, the platform outrigger assembly cannot later be reconfigured for placement on a truck frame of a different size.

The joint between the outrigger and platform is subjected to flexing forces resulting from the vibrations and shock attendant the operation of the crane mounted on the truck. The joint is in effect a pivot point about which the platform tries to shift when the outrigger is firmly emplaced on the ground, and motion is emparted to the platform by the operation of the crane. Welded joints are inherently rigid, and if the outrigger is welded to the equipment platform, the welding joint must bear the entire shear stress caused by the pivoting action of the platform about the outrigger.

It would therefore be a real advancement in the art to provide a structural support for attachment of outriggers to mobile equipment platforms that will facilitate the process of attaching the equipment platform and outrigger to the frame of a truck, eliminate the need for perforating the truck frame with bolt-receiving apertures, attenuate the effect of at least some of the shear stress at the outrigger and platform joints, and will easily accommodate attachment of equipment platforms and outriggers to truck frames of non-standard dimensions.

SUMMARY OF THE INVENTION

The problems outlined above are in large measure solved by the structural support in accordance with the present invention. Broadly speaking, the structural support in accordance with the present invention includes two pairs of laterally spaced apart, vertically oriented, elongated brackets attached to and depending from the equipment platform for respectively engaging and supporting each extensible support member of the outrigger, and releaseable bolt assemblies for securing the outrigger to the brackets. The extensible support members of the outrigger are respectively received between the brackets, and a slight gap is advantageously presented between the extensible member and adjacent brackets. In operation, the extensible member may freely shift within the brackets, and flexing forces are thereby distributed between the points of contact of the extensible support member with the brackets, and the releaseable bolt assemblies. Spacers may be interposed between the outrigger and the truck frame so that truck frames of non-standard dimensions may be readily accommodated by the structural support hereof.

In particularly preferred forms, the brackets are positioned slightly out of parallel in relation to each other so that the lowermost ends of the brackets are flared; this facilitates installation and proper centering of the outrigger support members between the brackets. The brackets are furthermore designed to deflect inwardly, adjacent their lower ends toward the longitudinal axis of the truck frame, such that when the securement bolts are tightened, the webs will bend inwardly to tightly abut against the truck frame.

DESCRIPTION OF THE PREFERRED EMBODIMENT

Figure 1:
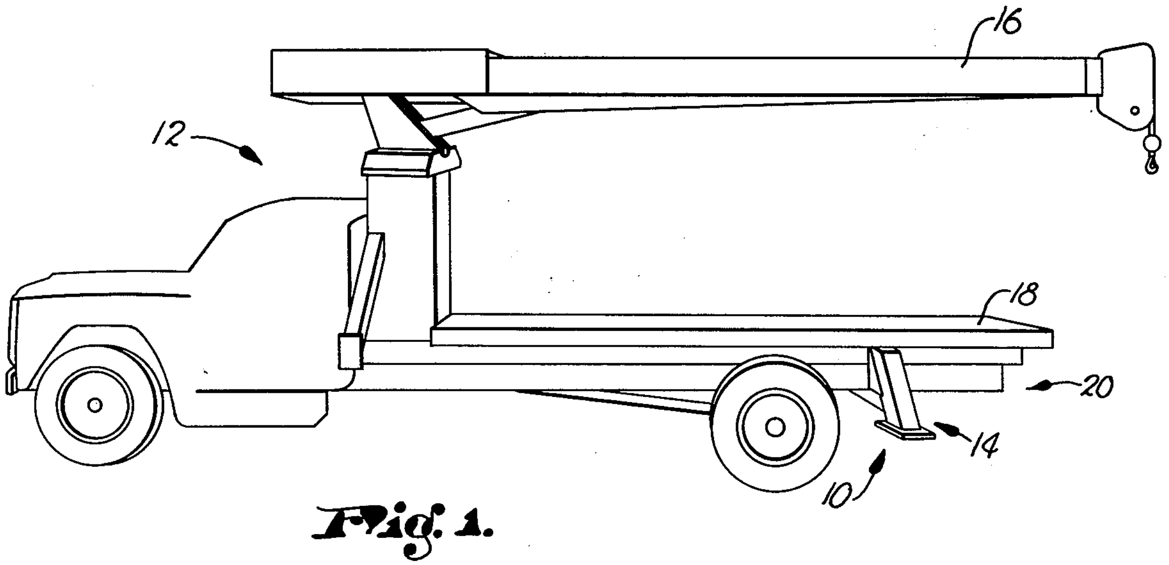
FIG. 1 is an elevational view of a truck equiped with an outrigger, and having a crane mounted on the truck frame.

Turning now to the drawings, and particularly to FIGS. 1, 3, 4 and 6, support structure 10 is illustrated in the context of a truck 12 having an outrigger assembly 14. For purposes of illustration, the truck 12 includes a boom-type crane 16, the latter being supported on a platform or sub-frame 18. As will be explained, the platform 18 is affixed to the main frame 20 of the truck 12.

In more detail, the support structure 10 includes two opposed pairs of brackets 22 which are secured to the platform 18 by welding, along with releaseable bolt means 24 serving to secure the outrigger assembly 14 to the brackets 22 in a manner to be described.

Figure 3:
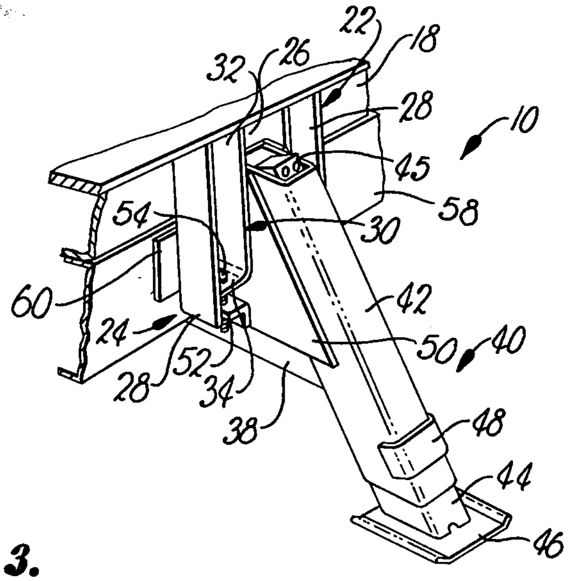
FIG. 3 is a fragmentary view of an outrigger and equipment platform, attached by a structural support in accordance with the present invention, and connected to a truck frame.
Figure 6:
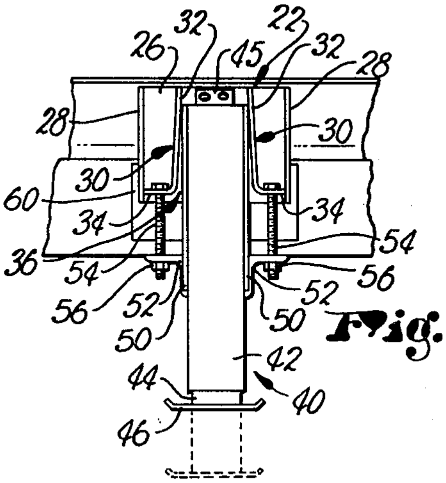
FIG. 6 is a fragmentary view of an outrigger and equipment platform, attached by a structural support in accordance with the present invention, and connected to a truck frame, phantom lines depicting shiftable member of the outrigger in a ground-engaging position.

As best seen in FIGS. 3 and 6, each bracket pair includes a metallic backing plate 26 directly welded to the platform 18 and having the opposed lateral margins thereof bent outwardly to define a pair of endmost reinforcing webs 28. Those skilled in the art will perceive that the backing plate 26 could alternatively be attached to main frame 20 of truck 12. Each bracket 22 is defined by an integral metallic web 30 welded to the front face of back plate 26 and presenting a generally upright, elongated portion 32 and a generally horizontal tab portion 34. As best seen in FIG. 6, the respective upright portions 32 are obliquely oriented relative to one another to present, adjacent the lower ends of the upright portions 32, an enlarged opening 36. In addition, each tab portion 34 is apertured for passage of a bolt therethrough.

Figure 4:
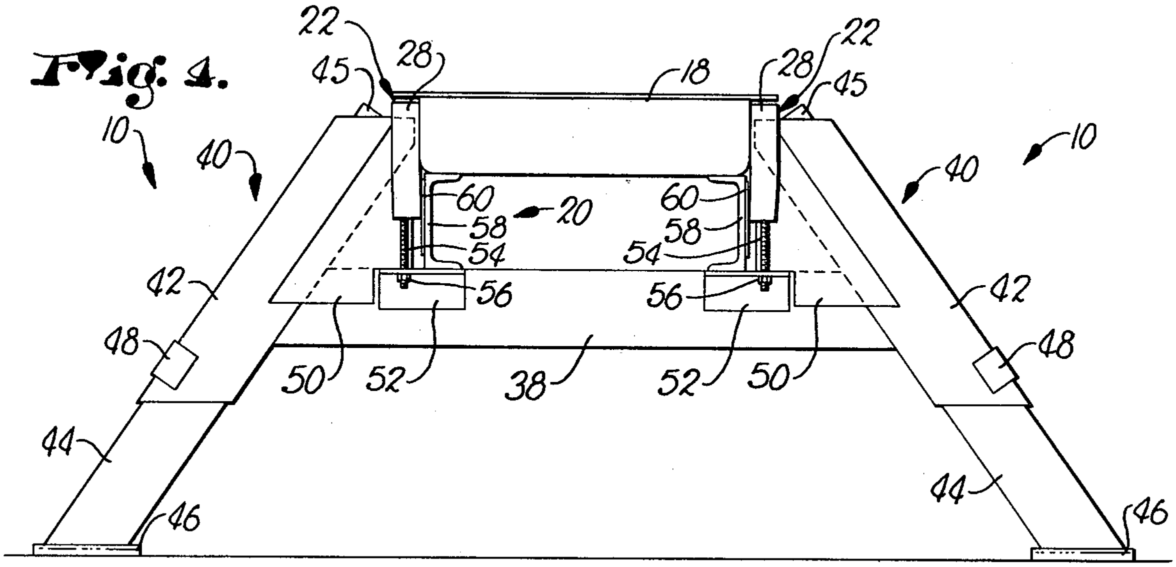
FIG. 4 is an end elevational view of an outrigger and equipment platform, attached by a structural support in accordance with the present invention and connected to a truck frame, with the extensible members of the outrigger illustrated in their ground-engaging positions.

The outrigger assembly 14 includes an elongated, transversely extending main beam 38 along with a pair of end-mounted, obliquely oriented support assemblies 40. Each assembly 40 includes an uppermost, elongated, tubular element 42 which is welded to the beam 38. An elongated, axially reciprocal leg 44 is telescopically received by the lower end of each element 42 whereas the upper end of each element 42 receives a conventional valve block 45. The lowermost end of each leg 44 is provided with a ground-engaging pad 46, as is conventionally in outrigger assemblies of this type. In addition, a reinforcing boot 48 is affixed to each element 42 in order to strengthen the overall outrigger assembly 14. In the embodiment of FIGS. 3, 4 and 6, a pair of generally triangular gusset plates 50 are respectively welded on opposite sides of each element 42, and are affixed to the latter and beam 38 as best seen in FIG. 4.

The beam 38 is also provided with four relatively short metallic angles 52 which are arranged in opposed pairs and are welded on opposite sides of the beam 38 (see FIGS. 4 and 6). The uppermost, horizontally extending flange of each of the angles 52 is apertured for purposes to be made clear hereinafter.

The bolt means 24 includes a total of four elongated, threaded bolts 54, along with corresponding nuts 56, which are employed for releaseable securing outrigger assembly 14 to the brackets 22.

Turning now to FIG. 4, it will be observed that the truck frame 20 includes a pair of elongated, laterally spaced apart beams 58. The platform 18 rests atop the beams 58, with the brackets 22 depending from the platform and extending to a point approximately midway the height of the respective beams 58. It will further be observed that the backing plates 26 forming a part of the overall bracket assemblies are oriented in closely conforming relationship to the underlying frame beams 58. In addition, the beams may be equiped with tack welded spacer plates 60 which engage the inner faces of the respective backing plates 26 (see FIG. 3).

In installation procedures on the truck 12, the following steps are typically followed. First, the platform 18 with attached brackets 22 is positioned atop truck frame 20. In this orientation, as explained, the brackets extend downwardly on opposite sides of the frame adjacent the beams 58. At this point, outrigger assembly 14 is positioned such that the beam 38 thereof underlies the truck frame 20 and the respective elements 42 are received between the associated brackets 22 on each side of the platform 18. Such positioning of the elements is facilitated by virtue of the described orientation of the upright portions 32. That is to say, enlarged openings 36 permit easy insertion of the elements 42 into the spaces between the associated brackets, so that the elements 42 can be slid upwardly into engagement with the upper ends of the portions 32 (see FIG. 6).

The next step in the installation procedure involves passing the bolts 54 through the apertures in the tab portions 34 and the angles 52, followed by installation of the nuts 56. In this regard, it will be seen (FIG. 4) that the boltreceiving apertures are aligned so that, upon tightening of the bolts 56, the lowermost ends of the backing plates 26 are bent or deflected inwardly towards the adjacent beams 58. This serves to enhance the overall integrity of the structural connection, as will be readily perceived.

Those skilled in the art will appreciate that the above described sequence of installation requires no drilling of the beams 58 or extensive welding thereto. However, the resultant structural connection of the platform 18 and outrigger assembly 14 is extremely secure, in that both of these elements are tightly drawn against the frame 20 by virtue of the bolt means 24.

Figure 2:
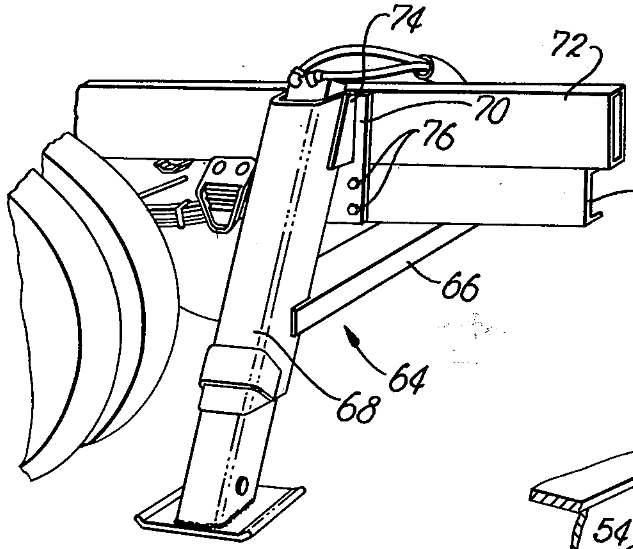
Fig. 2. Prior Art
FIG. 2 is a fragmentary perspective view depicting a structural support in accordance with the prior art, serving to connect an outrigger to the frame of a mobile vehicle.

The foregoing is to be contrasted with the conventional techniques employed for installing outrigger assemblies onto truck frames. Referring to FIG. 2, such a prior arrangement is illustrated in connection with a truck frame 62 and an outrigger assembly 64 having a transversely extending main beam 66 and a pair of obliquely oriented, ground-engaging upport members 68. In this situation, a backing plate 70 is welded to a sub-frame 72, with the plate 70 depending to a point adjacent the frame 62. Each plate 70 includes a pair of laterally spaced apart, outwardly extending webs 74 which receive an associated support member 68 as illustrated. Connection of the plates 70 to the frame 62 is effected by means of bolts 76 extending through the plates 70 and the frame 62. As explained, this type of mounting assembly can be very difficult and time consuming to install, and is therefore defficient. However, the problems of installation associated with the FIG. 2 assembly are completely obviated with the present invention which requires no drilling of the truck frame or extensive welding thereto.

Figure 5:
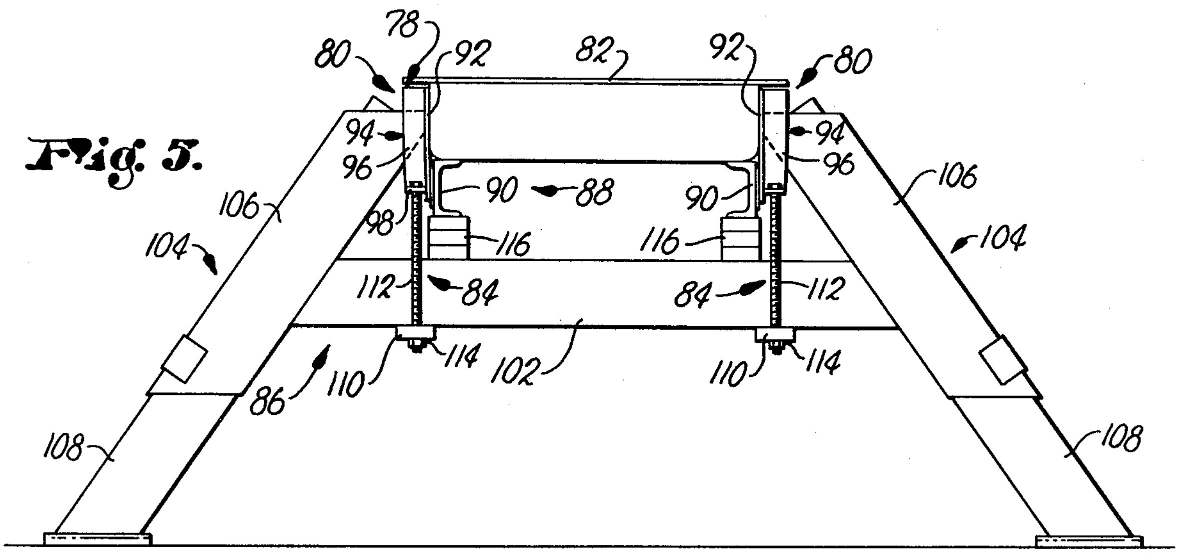
FIG. 5 is similar to FIG. 4, but depicts an alternative embodiment of the present invention.
Figure 7:
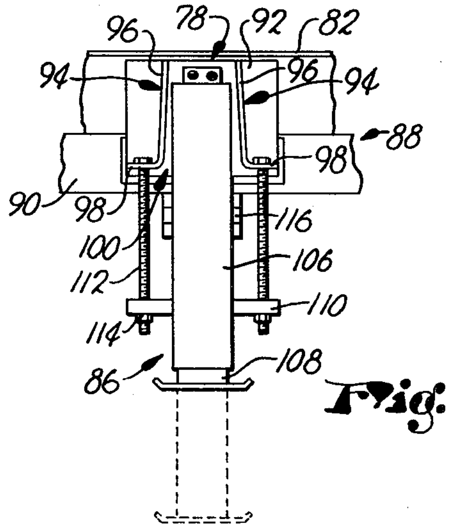
FIG. 7 is similar to FIG. 6, but depicts an alternative embodiment of the present invention.

The embodiment of the instant invention described in connection with FIGS. 3, 4 and 6 is designed for heavy duty usage. Another embodiment typically employed where duty requirements are less stringent, is depicted in FIGS. 5 and 7. Broadly speaking, the support structure 78 of this embodiment includes two opposed pairs of brackets 80 secured to a sub-frame or platform 82, along with bolt means 84 serving to secure an outrigger assembly 86. As illustrated, a relatively light duty truck frame 88 is presented, having a pair of spaced apart beams 90.

In many respects the support structure 78 is similar to the above-described structure 10. Thus, the overall bracket assemblies include a backing plate 92 having a pair of outwardly extending webs 94 welded thereto in laterally spaced relationship to one another. Here again, the webs 94 include an elongated, upright portion 96 and a generally horizontal, apertured tab portion 98. The upright portions 96 are obliquely oriented relative to one another and present an enlarged, lowermost outrigger-receiving opening 100 therebetween. The backing plates 92 are respectively welded to the side margins of the platform 82 and depend therefrom to a point adjacent the underlying beams 90. Those skilled in the art will percieve that the backing plates 92 could alternatively be attached to main frame 88.

The outrigger assembly 86 includes a transversely extending main beam 102 and a pair of endmost, obliquely oriented support assemblies 104 each having a tubular uppermost element 106 and an extensible leg 108 telescopically and reciprocally received with the latter. A pair of mounting blocks 110 are positioned adjacent the underside of beam 102 and have a pair of bolt-receiving openings therethrough.

Bolt means 84 includes four elongated, threaded bolts 112 and associated nuts 114, as will be readily observed from a study of FIGS. 5 and 7.

Installation of the support structure 78 is in most respects identical with that described in connection with the structure 10. That is to say, the platform 82 is first initially positioned atop the beams 90, with the bracket assemblies 80 depending therefrom to a point adjacent the beams 90. At this point the outrigger assembly 104 can be positioned beneath the beams 90 and with the respective support elements 106 between the associated brackets 82, all as described hereinabove as shown in FIG. 7, however, the elements 106 need not be in direct engagement with the portions 96 at all times, and can be slightly spaced therefrom. During use of the invention, however, the portions 96 serves to engage and restrain lateral movement of the support assemblies. However, in some instances, because of particular truck dimensions, it may be required to interpose one or more spacers 116 between the undersides of the beams 90, and the upper surface of the outrigger main beam 102. Those skilled in the art will further readily perceive that such use of spacers may be necessary in conjunction with the support structure 10, again depending principally upon the dimensional relationship between the truck frame and the outrigger assembly employed.

The final installation step involves passing the bolts 112 through the apertures in the tab portions 98, and through the apertures in the underlying mounting blocks 110, followed by installation of the nuts 114. Tightening of these nuts serves to bend or deflect inwardly the associated bracket structures so that the lower ends of the associated backing plates 92 come into firm engagement with the beams 90 (or with spacer plates welded to the beams 90, if employed). Those skilled in the art will percieve that, when the support assemblies 104 are in their ground-engaging configurations, the top portion of tubular elements 106 will be forced inwardly against back plates 92. The inward force exerted by the elements 106 will further crimp the back plates 92 into abutting relationships with the beams 90, and will provide transverse support to the equipment platform. As is readily apparent, this crimping effect is also manifested when the heavy duty structural support 10 is employed.

It will be observed that in both of the described embodiments of the present invention a secure yet somewhat flexible joint is formed between the outrigger assembly and associated platform. By virtue of this construction, flexing forces resulting from vibrations and shock incident to the operation of the crane or other equipment are accommodated without lessening the integrity of the overall assembly. This is to be contrasted with prior connecting structures which can be adversely affected by boom operation.

We claim:

1. A mounting assembly for attaching an outrigger assembly to a truck frame, said truck frame having a platform mounted thereon and said outrigger assembly presenting a pair of spaced-apart, elongated, extensible, ground-engaging support members and an elongated beam extending between and secured to said support members, each support member having a lowermost, ground-engaging end and an uppermost, attachment end, said mounting assembly comprising:

bracket means for providing lateral support to said outrigger assembly, including a pair of laterally spaced bracket members secured to said truck platform, each bracket member presenting a support member-engaging web; and means for securing said outrigger assembly to said bracket means including bolt means interconnecting said bracket means and said beam for disposing said beam adjacent said truck frame and for positioning the attachment end of each support member in operative engagement with the respective bracket member web.

2. An assembly as set forth in claim 1, each support member-engaging web having a pair of spaced-apart, elongated plate portions defining a channel opening therebetween for slidably receiving and laterally securing the attachment end of the respective support member.

3. An assembly as set forth in claim 1, each bracket member including tab structure defining an aperture therethrough for receiving said bolt means, such that when said bolt means are tightened said beam is drawn towards said truck frame.

4. An assembly as set forth in claim 3, said beam having structure defining an aperture for receiving said bolt means, said tab and beam apertures aligned and each bracket member depending from said truck platform, each bracket member being deflectable into tightly abutting relation with said truck frame when said bolt means are tightened.

5. An assembly as set forth in claim 4, including spacing structure interposed between at least one of said bracket members and said truck frame.

6. An assembly as set forth in claim 1, including spacing structure interposed between said beam and said truck frame.

7. An outrigger assembly for attachment to a truck frame or the like, in combination comprising:

an outrigger mechanism including a pair of spaced-apart, elongated extensible support members and an elongated beam extending generally transversely between and secured to said support members, each support member presenting a lowermost, ground-engaging end and an uppermost, attachment end;

bracket means for engaging the attachment ends of the respective support members, including a pair of bracket members each having a support member-engaging web;

means for mounting said bracket means to said truck frame; and means for securing said outrigger mechanism to said truck frame including bolt means interconnecting each bracket member to said beam for drawing said beam towards said truck frame and for positioning each attachment end in operative engagement with the respective web.

8. An assembly as set forth in claim 7, said truck frame having a platform mounted thereon and said bracket means being secured to said platform.

9. An assembly as set forth in claim 8, said securing means being operable for interposing said truck frame between said platform and said beam.

10. An assembly as set forth in claim 7, including spacing structure interposed between said beam and said truck frame.

11. An assembly as set forth in claim 7, each web having a pair of spaced-apart, elongated plate portions for slidably receiving said respective attachment end therebetween.

12. An assembly as set forth in claim 7, each bracket member including a tab having structure defining an aperture and said beam having structure defining an aperture corresponding to each bracket member, said bolt means being operatively received in the respective tab and beam apertures.

* * * * *